J. C. CAKE.
PEDAL OPERATOR.
APPLICATION FILED JULY 15, 1912.
1,084,876.
Patented Jan. 20, 1914.
2 SHEETS—SHEET 1.
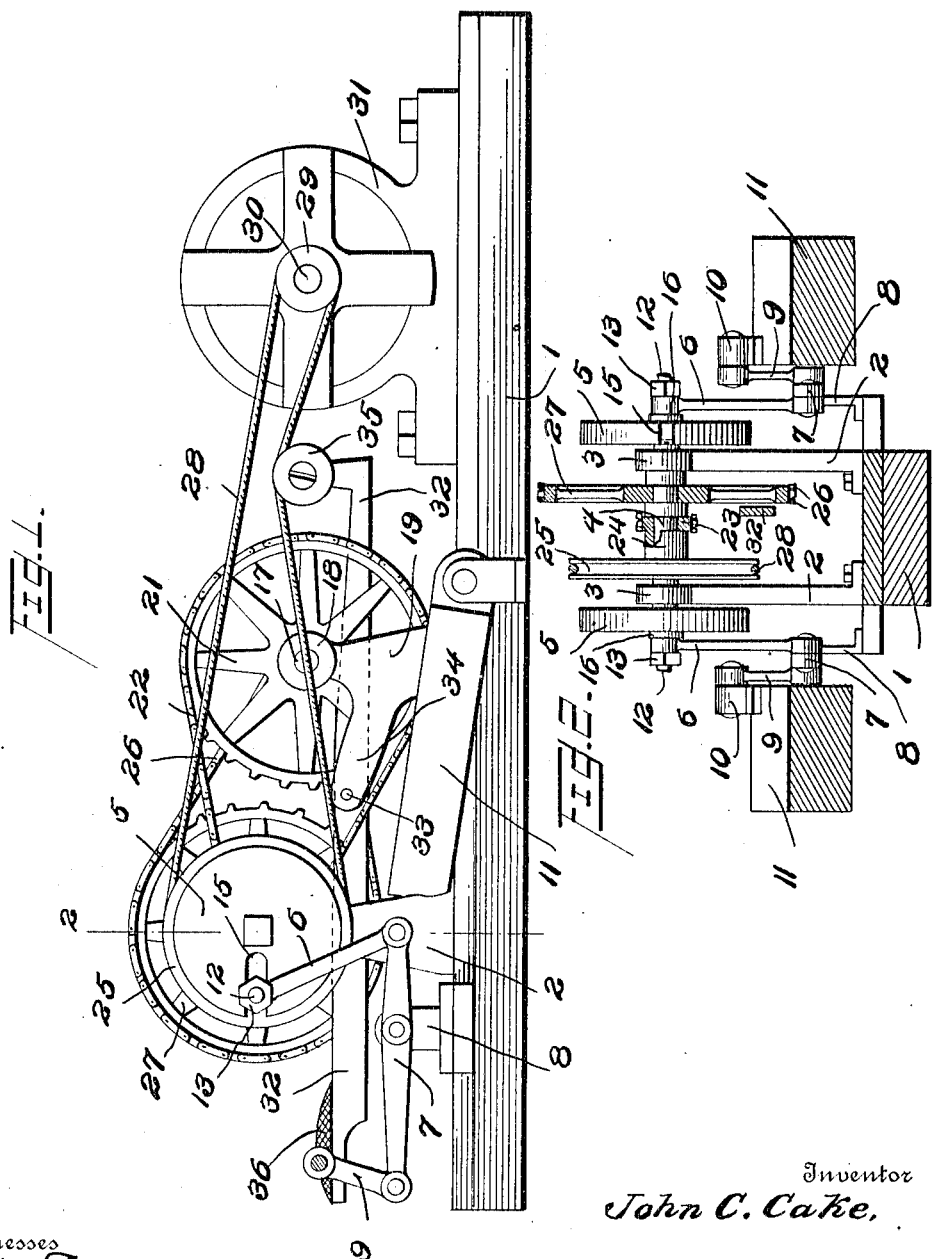
Witnesses
H. Strauss
R. H. Krenkel
Inventor
John C. Cake,
By Joshua R. H. Potts
Attorney

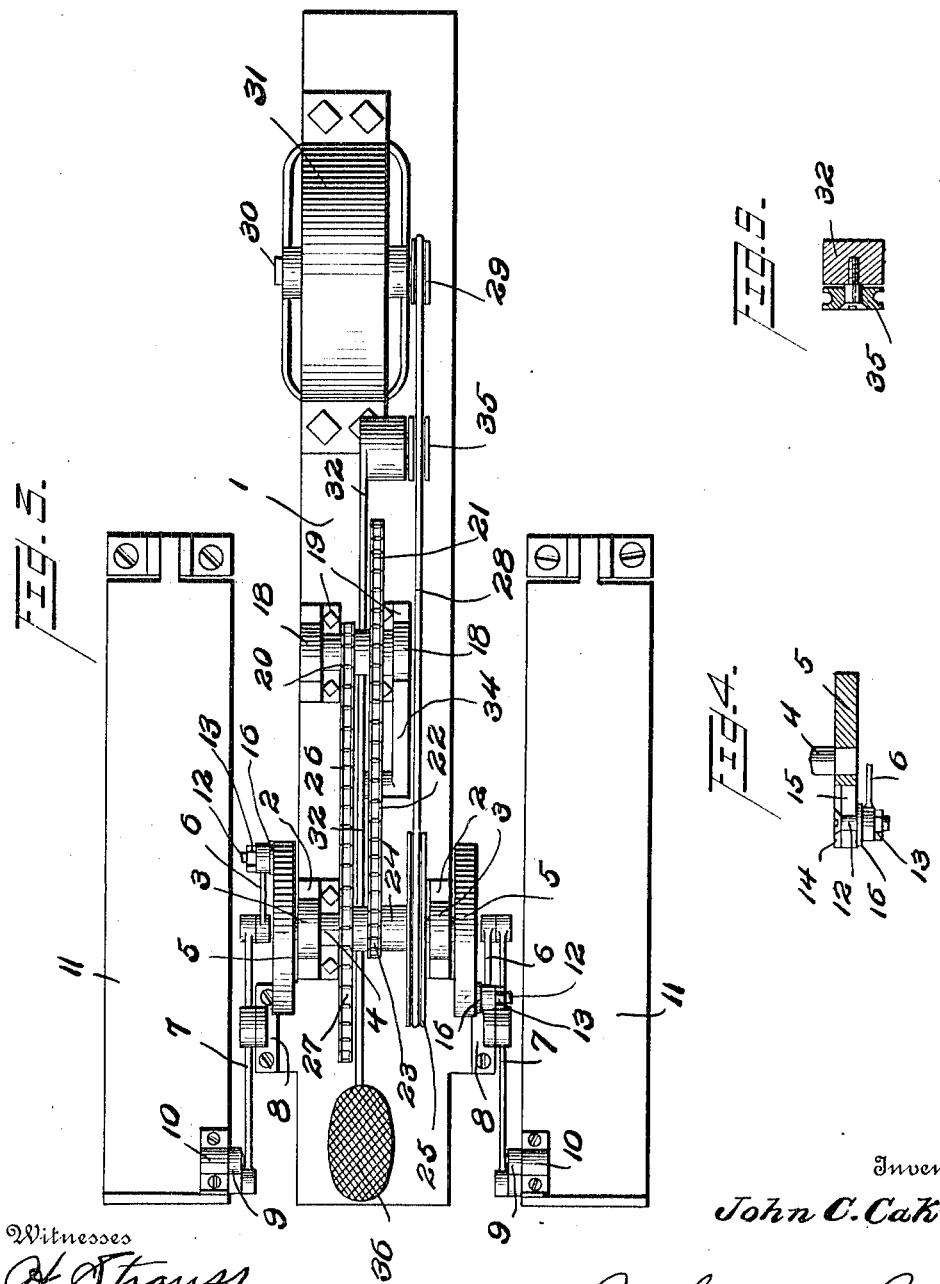

UNITED STATES PATENT OFFICE.

JOHN C. CAKE, OF CHESTER, PENNSYLVANIA.

PEDAL-OPERATOR.

1,084,876.

Specification of Letters Patent.

Patented Jan. 20, 1914.

Application filed July 15, 1912. Serial No. 709,341.

*To all whom it may concern:*

Be it known that I, JOHN C. CAKE, a citizen of the United States, residing at Chester, in the county of Delaware and State of Pennsylvania, have invented certain new and useful Improvements in Pedal-Operators, of which the following is a specification.

My invention relates to improvements in pedal operators, the object of the invention being to provide improved means for oscillating the pedals of a pneumatic piano, organ or other similar mechanism in which the rapidity of such operation is under the control of the operator.

A further object is to provide an improved mechanical power transmitting mechanism operated by a motor having a belt connecting the same with the mechanical mechanism, and said belt moved into and out of operation by a foot lever.

With these and other objects in view, the invention consists in certain novel features of construction and combinations and arrangements of parts as will be more fully hereinafter described and pointed out in the claims.

In the accompanying drawings: Figure 1 is a view in side elevation showing one of the pedals to be operated broken away. Fig. 2 is a view in section on the line 2—2 of Fig. 1 showing parts in elevation and parts in section for purposes of clearness. Fig. 3 is a plan view of Fig. 1, and Figs. 4 and 5 are views in section illustrating details of construction.

1 represents a base having uprights 2 thereon provided with bearings 3 at their upper ends in which a shaft 4 is mounted. This shaft 4 at both ends is provided with crank disks 5, and the latter are connected by links 6 with the ends of levers 7. Levers 7 are fulcrumed between their ends on brackets 8, and are connected at their opposite ends by links 9 with brackets 10 on the pedals 11 to be operated.

The links 6 are connected to the crank disks 5 by bolts 12 and nuts 13. The headed ends of the bolts are mounted to slide in the grooved inner edges 14 of radial slots 15 formed in the disks 5, and washers 16 are preferably interposed between the links 6 and the disks 5 as seen most clearly in Fig. 4.

A countershaft 17 is supported in bearings 18 on the upper ends of uprights 19 fixed to base 1, and on this countershaft 17, a relatively small sprocket wheel 20 and a relatively large sprocket wheel 21 are secured. The relatively large sprocket wheel is connected by a chain 22 with a relatively small sprocket wheel 23 fixed to the hub 24 of a pulley 25 loose on shaft 4. The relatively small sprocket wheel 20 is connected by a chain 26 with a relatively large sprocket wheel 27 fixed to shaft 4. The pulley 25 is connected by an endless belt 28 with a pulley 29 on a motor shaft 30. This motor shaft 30 is illustrated in connection with an electric motor 31 secured on base 1.

When power is transmitted from the motor shaft 30 to pulley 25, the speed will be reduced by reason of the transmission through small sprocket 23, chain 22, large sprocket 21, small sprocket 20, chain 26, and large sprocket 27, so that the shaft 4 will be driven at a comparatively low speed sufficient however for all purposes in operating the pedals.

The belt 28 is loose on the pulleys 25 and 29, and the slack is controlled by a foot lever 32. This foot lever 32 is fulcrumed between its ends on a pin 33 secured in an extension 34 on one of the uprights 19. At one end the lever 32 is provided with a pulley 35 which engages the belt 28, and the opposite end of this lever 32 is provided with a foot rest 36.

In operation, the motor may be started and the belt 28 will be sufficiently loose so that there will be no transmission of power from the electric motor to the mechanical mechanism. To throw in the power, the operator depresses the free end of foot lever 32. The device may be slowly started by regulating the pressure on the lever 32, because the belt 28 may be allowed to slip slightly until the mechanism is well in motion when a pressure on the lever may be applied with sufficient force to maintain a non-slipping connection betwen the pulleys and the belt. The operator may relieve this pressure by lifting his foot and by this means he may absolutely control the speed as well as the starting and stopping of the mechanism.

By providing the radial slots 15 in the crank disks 5, the stroke of the pedals can be readily varied to suit pedals having different depressions, by simply adjusting the bolts 12 in the slots.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A pedal operator comprising a base adapted to be positioned between a pair of pedals to be operated, a motor-driven transversely positioned shaft supported by the base, and projecting at both ends beyond the base, disks secured on the ends of said shaft in a plane outside of the side edges of the base and having radial slots therein, horizontal levers located longitudinally of the base and fulcrumed between their ends, bolts adjustably secured in the slots in the disk, links pivotally connecting said bolts with said levers, and other links pivotally connected to the other ends of said levers and adapted to be pivotally connected to the pedals to be operated, substantially as described.

2. The combination with a pair of pedals to be operated, of a supporting base positioned between the pedals, a transversely positioned motor-driven shaft supported on the base and located in a higher plane than the pedals, said shaft at both ends projecting beyond the sides of the base, disks on the ends of said shaft in a plane outside of the base, brackets on the base, horizontal levers longitudinally positioned with relation to the base and the pedals and fulcrumed between their ends on said brackets, links pivotally connecting said levers at one end to the pedals, other links pivotally connected to the other ends of said levers, and radially adjustable bolts on said disks pivotally connecting the other ends of said last-mentioned links to said disks, substantially as described.

In testimony whereof I have signed my name to this specification in the presence of two subscribing witnesses.

JOHN C. CAKE.

Witnesses:
S. W. FOSTER,
CHAS. E. POTTS.

---

Copies of this patent may be obtained for five cents each, by addressing the "Commissioner of Patents, Washington, D. C."